United States Patent
Tang et al.

(10) Patent No.: US 10,992,215 B2
(45) Date of Patent: Apr. 27, 2021

(54) VIBRATION MOTOR

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 7 days.

(21) Appl. No.: 16/527,017

(22) Filed: Jul. 31, 2019

(65) Prior Publication Data

US 2020/0044536 A1 Feb. 6, 2020

(30) Foreign Application Priority Data

Aug. 3, 2018 (CN) .......................... 201821255517.5

(51) Int. Cl.
*H02K 33/12* (2006.01)
*B06B 1/04* (2006.01)

(52) U.S. Cl.
CPC .............. *H02K 33/12* (2013.01); *B06B 1/045* (2013.01)

(58) Field of Classification Search
None
See application file for complete search history.

(56) References Cited

U.S. PATENT DOCUMENTS

| 2011/0198949 A1* | 8/2011 | Furuich | H02K 33/16 310/25 |
| 2018/0111163 A1* | 4/2018 | Xu | B06B 1/045 |
| 2018/0351442 A1* | 12/2018 | Liu | H02K 33/14 |
| 2018/0351443 A1* | 12/2018 | Liu | H02K 33/16 |

FOREIGN PATENT DOCUMENTS

CN 206341115 U * 7/2017 ............. B06B 1/045

* cited by examiner

*Primary Examiner* — Quyen P Leung
*Assistant Examiner* — Minki Chang
(74) *Attorney, Agent, or Firm* — W&G Law Group LLP

(57) ABSTRACT

Disclosed is a vibration motor including a housing, a vibrator accommodated in the housing, a driving apparatus, and an elastic part elastically supporting the vibrator. The housing includes a top wall, a bottom wall and a side wall, the vibrator includes a counterweight block and a magnet steel disposed therein, and the counterweight block includes an upper surface, a lower surface, and an inner wall connecting the upper surface and the lower surface. The driving apparatus includes a first coil, a second coil, and an iron core. The iron core includes a main body portion, a first fixed end, and a second fixed end, the first coil is sleeved over the first fixed end, the second coil is sleeved over the second fixed end, and the main body portion of the iron core is disposed in the hollow portion and disposed opposite and spaced from the magnet steel.

10 Claims, 3 Drawing Sheets

VIBRATION MOTOR

TECHNICAL FIELD

The present disclosure relates to the field of vibration motors, and in particular, to a linear vibration motor that linearly vibrates.

BACKGROUND

With the development of electronics technologies, portable consumer electronic products such as mobile phones, handheld game consoles, navigation apparatuses or handheld multimedia entertainment devices become increasingly popular among people. Linear vibration motors are usually used in these electronic products to provide system feedbacks such as call alerts, message alerts, and navigation alerts of mobile phones and vibration feedbacks of game consoles. Such wide application requires that vibration motors have high performance and long service life.

A vibration motor generally includes a housing having an accommodation space, a vibrator accommodated in the accommodation space, and an elastic part connecting the housing and the vibrator. The elastic part supports the vibrator to move reciprocally in the housing to vibrate. For the vibration motor in the prior art, the vibrator is generally driven by means of mutual induction between a coil and a magnet steel. However, a driving force provided by this method is insufficient and is hardy to meet a requirement of the vibration motor.

Therefore, a new vibration motor needs to be provided to resolve the foregoing problems.

DETAILED DESCRIPTION

The present disclosure is further described below with reference to the accompanying drawings.

Figure 1:
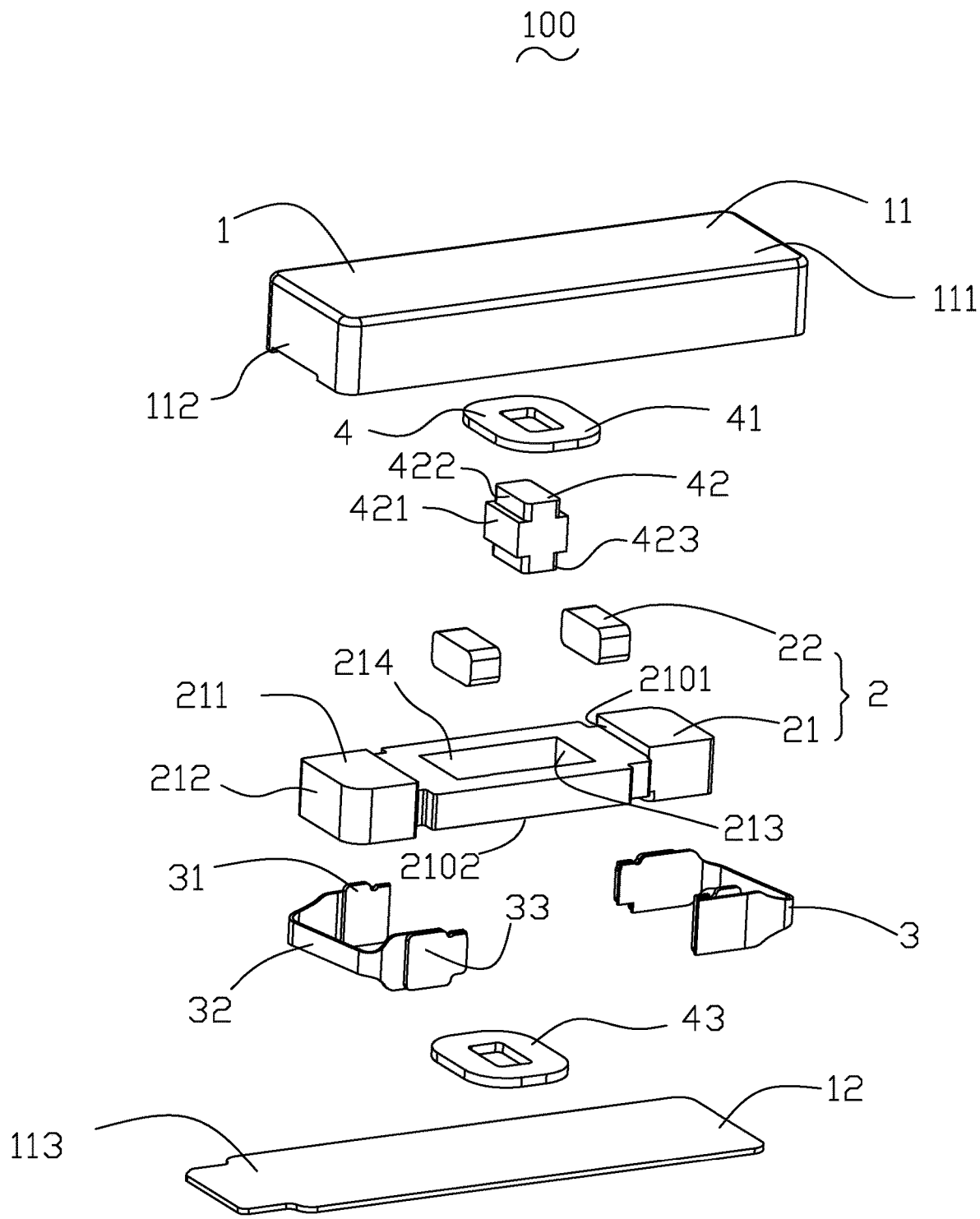
FIG. 1 is an exploded schematic structural diagram of a vibration motor according to the present disclosure.
Figure 2:
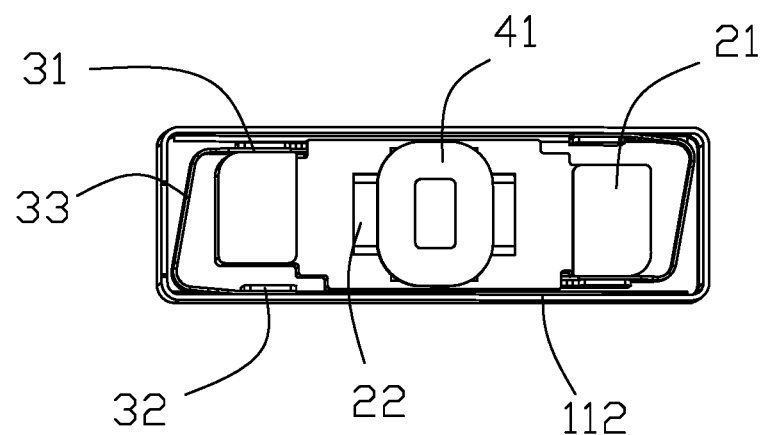
FIG. 2 is a partially assembled schematic structural diagram of a vibration motor according to the present disclosure.

As shown in FIG. 1 and FIG. 2, the present disclosure provides a vibration motor 100, including a housing 1, a vibrator 2 accommodated in the housing 1, an elastic part 3 elastically supporting the vibrator 2, and a driving apparatus 4 driving the vibrator 2 to vibrate in a vibrate direction.

The housing 1 has an elongated structure, and includes a top wall 111, a bottom wall 113 opposite the top wall, and a side wall 112 connecting the top wall 111 and the bottom wall 113. Specifically, in this embodiment, the housing 1 includes a cover plate 11 having the top wall 111 and the side wall 112, and a bottom plate 12 covering the cover 11 and forming an accommodation space with the cover 11. The bottom plate 12 serves as the bottom wall 113. The driving apparatus 4 is fixed on the housing 1, and one end of the elastic part 3 is connected to the vibrator 2 and the other end is connected to the side wall 112 of the housing 1.

The driving apparatus 4 specifically includes a coil disposed in the housing 1 and an iron core 42 corresponding to the coil. The vibrator 2 includes a magnet steel 22 corresponding to the coil 41 and the iron core 42. During electrification, the coil is driven by a Lorentz force in a magnetic field to drive the vibrator 2 to vibrate along a direction parallel to the bottom wall 113. In this embodiment, there are two coils, including a first coil 41 disposed on the top wall 111 and a second coil 43 disposed on the bottom wall 113. The first coil 41 and the second coil 43 are symmetrically disposed along the vibrate direction of the vibrator.

The iron core 42 includes a main body portion 421, a first fixed end 422 extending from the main body portion 421 toward the top wall 111, and a second fixed end 423 extending from the main body portion 421 to the bottom wall 113. The first coil 41 is sleeved over the first fixed end 422. The second coil 43 is sleeved over the second fixed end 423. The iron core 42 extending from the first coil 41 to the second coil 43, and along an extension direction of the iron core 42, the main body portion 421 has a first orthographic projection, the first fixed end 422 has a second orthographic projection falling on the main body portion 421, the second fixed end 423 has a third orthographic projection falling on the main body portion 421, and an areas of the second orthographic projection D2 and the third orthographic projection D3 are smaller than those of the first orthographic projection D1. During electrification, a magnetic field is generated between the coils and the iron core 42, and mutual attraction and repulsion with the magnet steel 22 of the vibrator 2 drive the vibrator to vibrate.

The vibrator 2 includes a counterweight block 21 and a magnet steel 22 disposed in the counterweight block. Specifically, in this embodiment, the counterweight block 21 includes an upper surface 211 corresponding to the top wall 111, a lower surface corresponding to the bottom wall 113, and a hollow portion penetrating through the upper surface 211 and the lower surface and enclosed by the inner wall. The driving apparatus 4, specifically the iron core 42 of the driving apparatus 4 in this embodiment, is disposed in the hollow portion, and is disposed opposite and spaced from the inner wall defining the hollow portion. The inner wall includes at least two first inner walls and second inner walls 214 connected to the first inner walls 213, and at least two magnet steels 22 are disposed on the first inner walls 213. Specifically, in this embodiment, the inner wall includes the two first inner walls 213 disposed along a short axis direction and the two second inner walls 214 disposed along a long axis direction. The magnet steel 22 is disposed on the first inner wall 213. In this embodiment, there are two magnet steels 22 that are disposed on the two first inner walls 213 and symmetrically disposed with respect to the iron core 42 at a distance. A distance between the magnet steel 22 and the iron core 42 is greater than a maximum amplitude of the vibrator, so that during vibration of the vibrator 2, the iron core 42 moves relatively between the two magnet steels 22.

Figure 3:
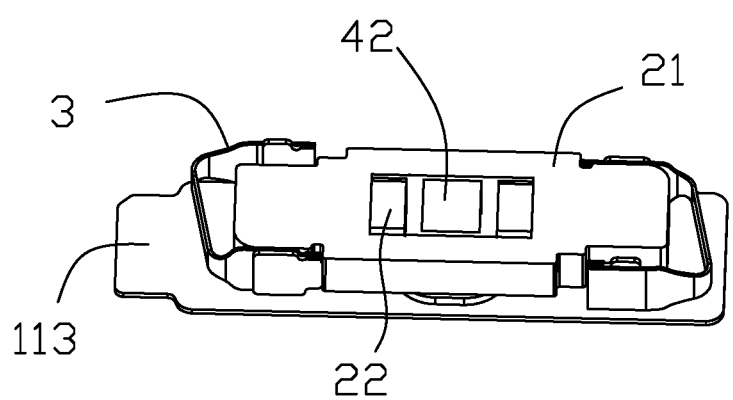
FIG. 3 is a partially assembled schematic structural diagram of a vibration motor according to the present disclosure.
Figure 4:
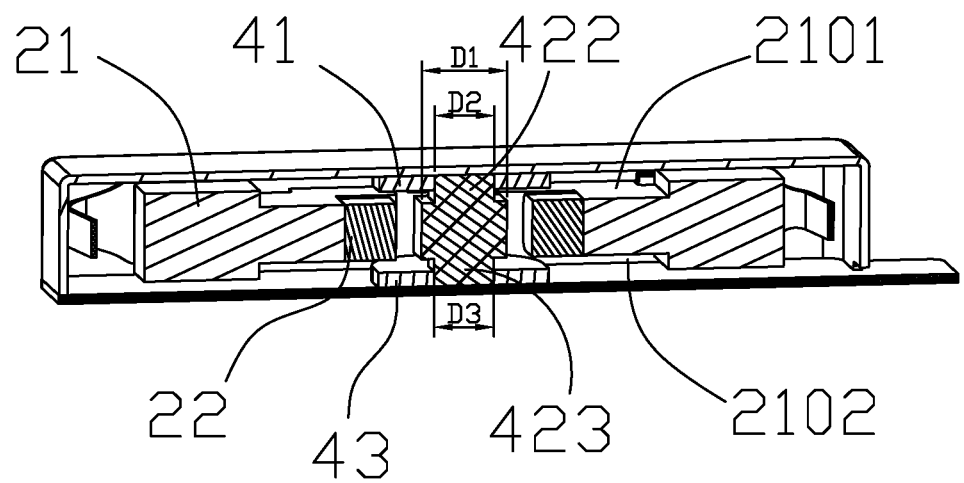
FIG. 4 is a sectional view of a vibration motor according to the present disclosure.

Referring to FIG. 3 and FIG. 4, further, the upper surface 211 of the counterweight block 21 is provided with a first escape groove 2101 recessed toward the lower surface, and the first escape groove 2102 corresponds to the first coil 41. Correspondingly, the lower surface is recessed toward the upper surface 211 to form a second escape groove 2102, and the second escape groove 2102 corresponds to the second coil 43. The first escape groove 2101 and the second escape groove 2102 are provided, so that noise or impact on product reliability caused by collision between the vibrator and the coils can be avoided.

The elastic part 3 is two C-type springs with opening directions disposed opposite each other. Specifically, the elastic part 3 includes a first fixed portion 31 connected to the counterweight block 21 of the vibrator 2, a second fixed portion 32 connected to the side wall 112, and a connecting portion 33 connecting the first fixed portion 32 and the second fixed portion 32.

By adopting the new driving manner of the vibration motor, large driving force is achieved on the premise that a dimension of the vibration motor is unchanged, thereby achieving a better vibration effect.

The vibration motor in the present disclosure includes the housing, the vibrator accommodated in the housing, the driving apparatus driving the vibrator to vibrate, and the elastic part elastically supporting the vibrator. The housing includes the top wall, the bottom wall disposed opposite the top wall, and the side wall connecting the top wall and the bottom wall. The vibrator includes the counterweight block and the magnet steel disposed in the counterweight block. The counterweight block includes the upper surface corresponding to the top wall, the lower surface corresponding to the bottom wall, and the inner wall connecting the upper surface and the lower surface. The inner wall defines the hollow portion penetrating through the counterweight block from the upper surface to the lower surface. The magnet steel is disposed in the inner wall. The driving apparatus includes the first coil disposed on the top wall, the second coil disposed on the bottom wall, and the iron core extending from the first coil to the second coil. The iron core includes the main body portion, the first fixed end extending from the main body portion toward the top wall and fixed on the top wall, and the second fixed end extending from the main body portion toward the bottom wall. The first coil is sleeved over the first fixed end, the second coil is sleeved over the second fixed end, and the main body portion of the iron core is disposed in the hollow portion and disposed opposite and spaced from the magnet steel. By adopting the new driving manner, the vibration motor achieves large driving force on the premise that a dimension of the vibration motor is unchanged, thereby achieving a better vibration effect.

Although the embodiments of the present disclosure are shown and described above, it can be understood that the embodiments are exemplary and cannot be construed as limitations to the present disclosure, and a person of ordinary skill in the art can make changes, modifications, replacement, and variations to the embodiments within the scope of the present disclosure.

What is claimed is:

1. A vibration motor, comprising a housing, a vibrator accommodated in the housing, a driving apparatus driving the vibrator to vibrate, and an elastic part elastically supporting the vibrator;
    wherein the housing comprises a top wall, a bottom wall disposed opposite the top wall, and a side wall connecting the top wall and the bottom wall;
    wherein the vibrator comprises a counterweight block and a magnet steel disposed in the counterweight block;
    wherein the counterweight block comprises an upper surface corresponding to the top wall, a lower surface corresponding to the bottom wall, and an inner wall connecting the upper surface and the lower surface, the inner wall defines a hollow portion penetrating through the counterweight block from the upper surface to the lower surface;
    wherein the magnet steel is disposed on the inner wall;
    wherein the driving apparatus comprises a first coil disposed on the top wall, a second coil disposed on the bottom wall, and an iron core extending from the first coil to the second coil; and
    wherein the iron core comprises a main body portion, a first fixed end extending from the main body portion toward the top wall and fixed on the top wall, and a second fixed end extending from the main body portion toward the bottom wall, the first coil is sleeved over the first fixed end, the second coil is sleeved over the second fixed end, and the main body portion of the iron core is disposed in the hollow portion and disposed opposite and spaced from the magnet steel; along an extension direction of the iron core, the main body portion has a first orthographic projection, the first fixed end has a second orthographic projection falling on the main body portion, the second fixed end has a third orthographic projection falling on the main body portion, and an areas of the second orthographic projection and the third orthographic projection are smaller than those of the first orthographic projection.

2. The vibration motor according to claim 1, wherein the inner wall of the hollow portion comprises a first inner wall disposed perpendicular to a vibrate direction of the vibrator, and the magnet steel is disposed on the first inner wall.

3. The vibration motor according to claim 2, wherein at least two first inner walls are disposed opposite and spaced from each other, and at least two magnet steels are disposed on the first inner walls respectively.

4. The vibration motor according to claim 2, wherein the upper surface is formed with a first escape groove recessed toward the lower surface, and the first escape groove opposite the first coil.

5. The vibration motor according to claim 4, wherein the lower surface is formed with a second escape groove recessed toward the upper surface, and the second escape groove opposite the second coil.

6. The vibration motor according to claim 2, wherein the lower surface is formed with a second escape groove recessed toward the upper surface, and the second escape groove opposite the second coil.

7. The vibration motor according to claim 1, wherein the first coil and the second coil are flat coils.

8. The vibration motor according to claim 1, wherein the elastic part is a C-type spring disposed at two sides of the vibrator, and the C-type spring comprises a first fixed portion connected to the vibrator, a second fixed portion connected to the side wall, and a connecting portion connecting the first fixed portion and the second fixed portion.

9. The vibration motor according to claim 1, wherein the driving apparatus is symmetrically disposed along the vibrate direction of the vibrator.

10. The vibration motor according to claim 1, wherein a distance between the magnet steel and the iron core is greater than a maximum amplitude of the vibrator.

* * * * *